No. 844,925.
PATENTED FEB. 19, 1907.
N. ELENTERIUS.
FISHING SEINE.
APPLICATION FILED AUG. 1, 1906.
2 SHEETS—SHEET 2.
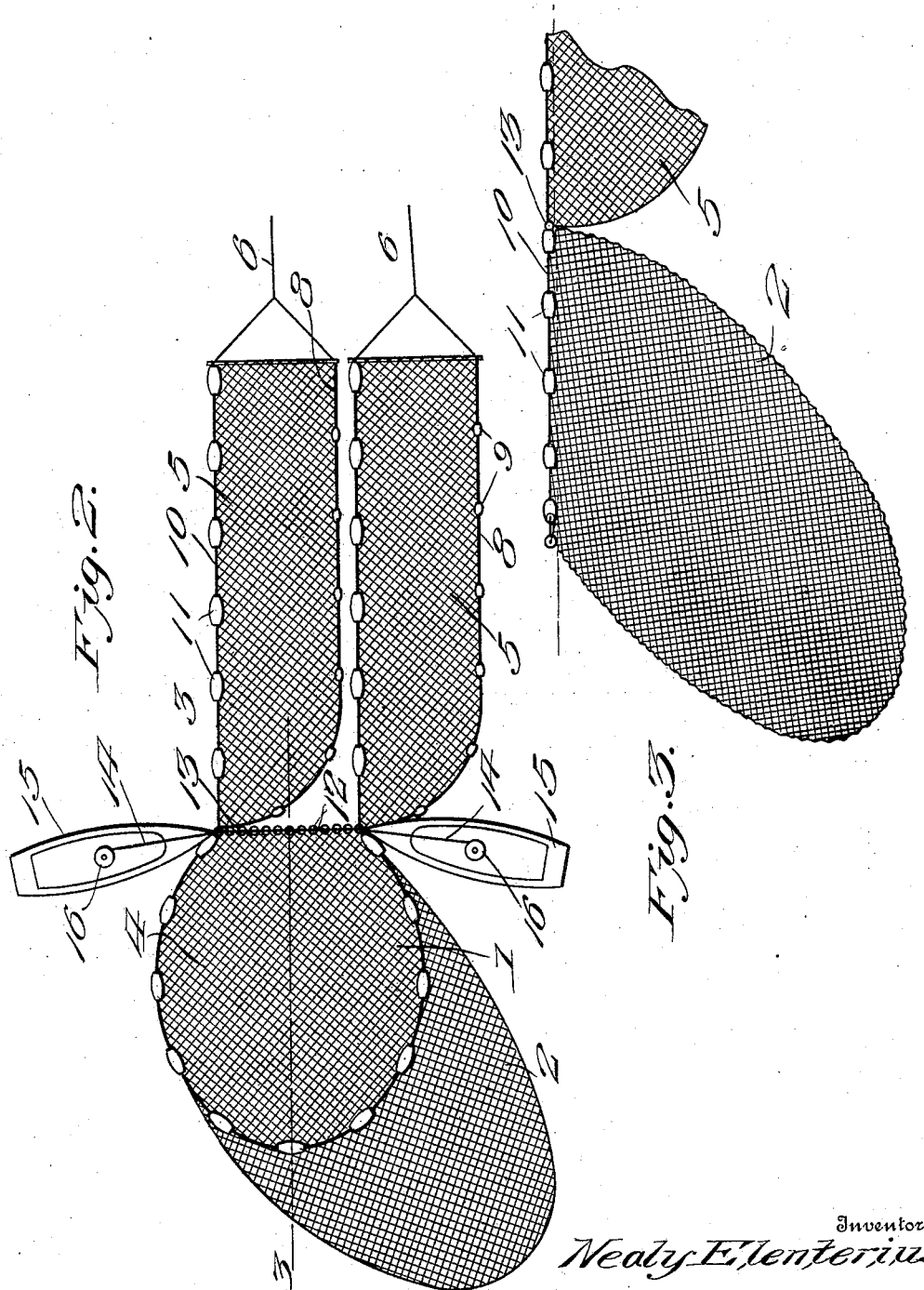

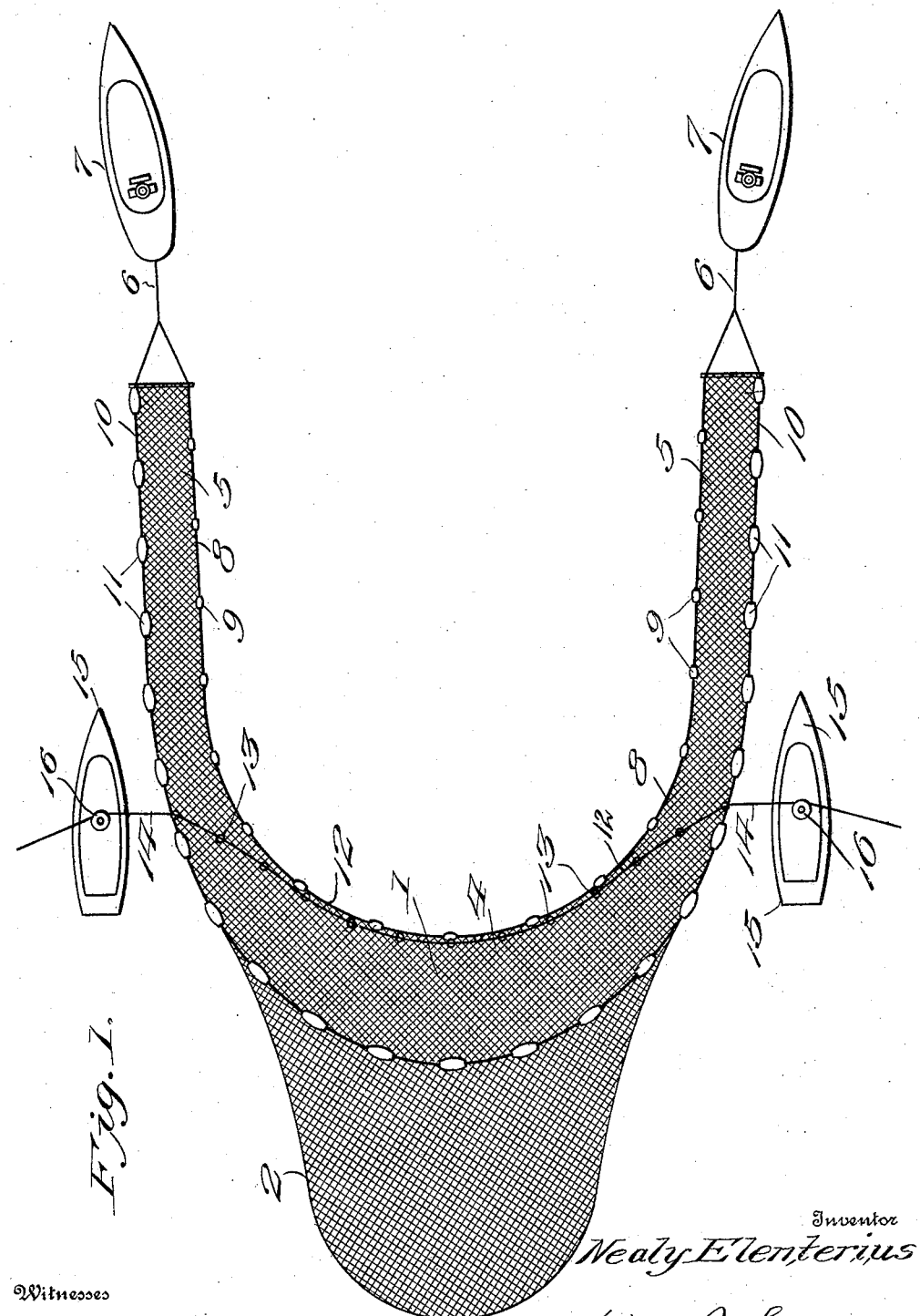

UNITED STATES PATENT OFFICE.

NEALY ELENTERIUS, OF BILOXI, MISSISSIPPI.

FISHING-SEINE.

No. 844,925.　　　　　Specification of Letters Patent.　　　　　Patented Feb. 19, 1907.

Application filed August 1, 1906. Serial No. 328,778.

*To all whom it may concern:*

Be it known that I, NEALY ELENTERIUS, a citizen of the United States of America, residing at Biloxi, in the county of Harrison and State of Mississippi, have invented new and useful Improvements in Fishing-Seines, of which the following is a specification.

This invention relates to improvements in fishing nets or seines especially designed for deep-water fishing and catching fish which run in schools, one object of the invention being to provide a net which may be closed and emptied of the entrapped fish without the necessity of pulling the net ashore.

Another object is to provide a net or seine which may be handled by manually-propelled or power boats and easily and conveniently spread, closed, and controlled.

With the above and other objects in view the invention consists of the novel construction, combination, and arrangement of parts hereinafter fully described and claimed, reference being had to the accompanying drawings, in which—

Figure 1 is a plan view showing the spread net for use. Fig. 2 is a perspective view showing the net closed and raised. Fig. 3 is a section on the line 3 3 of Fig. 2.

Referring to the drawings, 1 represents the body of the net or seine, which is formed with a bag or trap 2. The lower portion of the body extends in advance of the mouth of the trap to form a lower leader or guide to conduct or guide the fish into the trap. From the sides of the portion 4 extend forwardly-projecting side wings or leaders 5, which serve the usual function of leading the fish to the mouth of the trap. The forward ends of the leaders 5 are connected to rods or lines 6, by which the net may be secured to suitable boats or vessels 7 for towing it through the water. Extending around the forward portion of the bottom of the net and the lower edges of the leaders 5 is a weight-line 8, to which at suitable intervals are secured suitable weights 9 for holding the net properly submerged in the water with the parts spread or expanded for operation. Similarly connected with the upper edge of the body of the net and upper edges of the leaders 5 is a cork or float line 10, to which the buoys 11 are attached for suspending such portion of the net in the water and holding the bag 2 in open or receiving position.

Extending across the forward portion of the bottom 4 of the net is a purse-line 12, which runs through suitable guides 13, with its ends 14 projecting beyond the inner ends of the side leaders 5 for connection with rear tow boats or vessels 15. These vessels may be provided with windlasses 16, to which the ends 14 of the purse-line are attached, whereby said line may be wound up to contract the portion 4 of the net and to elevate the sack 2 when it is desired to remove the entrapped fish therefrom.

In operation the net is spread in the manner shown in Fig. 1 and towed through the water by the boats 7 and 15, which may be manually propelled or driven by suitable power. When it is desired to elevate the net and remove the fish from the sack, the boats 15 are turned and propelled inwardly against the portion 4 of the net, thus contracting the same on the purse-line 14, the ends of the line being wound up by the windlasses on the boats until it is fully contracted, as shown in Fig. 2. This operation not only contracts the net, but elevates the mouth of the sack 2 to the surface, so that the fish can be readily removed therefrom.

A net or seine of this character may be conveniently controlled and is admirably adapted for use in deep-water fishing and in catching fishes of that class which run in schools, the construction being such as hereinbefore described, as to wholly obviate the necessity of the net being hauled ashore to admit of its being emptied of its contents, thus enabling the fisherman to continue to fish at sea or in deep water until the holds of the vessels are filled.

Having thus described the invention, what is claimed as new is—

1. A fishing net or seine comprising a body portion formed with a sack or trap, and having side leaders extending forwardly therefrom and provided with towing connections, said trap being provided with a purse-line across the forward portion of the body thereof, whereby the net may be contracted and elevated, substantially as described.

2. A fishing net or seine comprising a body portion having a sack or trap, said body portion having its lower surface extending in advance of the mouth of the sack and provided with leaders projecting forwardly therefrom, and provided at their forward ends with towing connections, and a purse-line extending across the forwardly-projecting portion of the net-body and having its ends arranged to form towing connections and adapted to be wound up to permit of the contraction of the body of the net and elevation of the sack.

3. A fishing net or seine comprising a body having a sack or trap, said body being provided with a lower portion extending in advance of the mouth of the sack and having side leaders projecting forwardly therefrom, said leaders being provided at their ends with tow-lines, and a purse-line threaded across the forwardly-extending portion of the body with its terminals projecting toward the same for connection with winches on boats or floats, whereby the latter may be propelled inwardly to contract the net and wind up the purse-line to elevate the sack.

In testimony whereof I affix my signature in presence of two witnesses.

NEALY ELENTERIUS.

Witnesses:
W. L. COWART,
A. B. AUSTIN.